March 8, 1927.   LE ROY L. SCHMIDT   1,620,576
TRAFFIC SIGNAL
Filed July 8, 1925   2 Sheets-Sheet 1
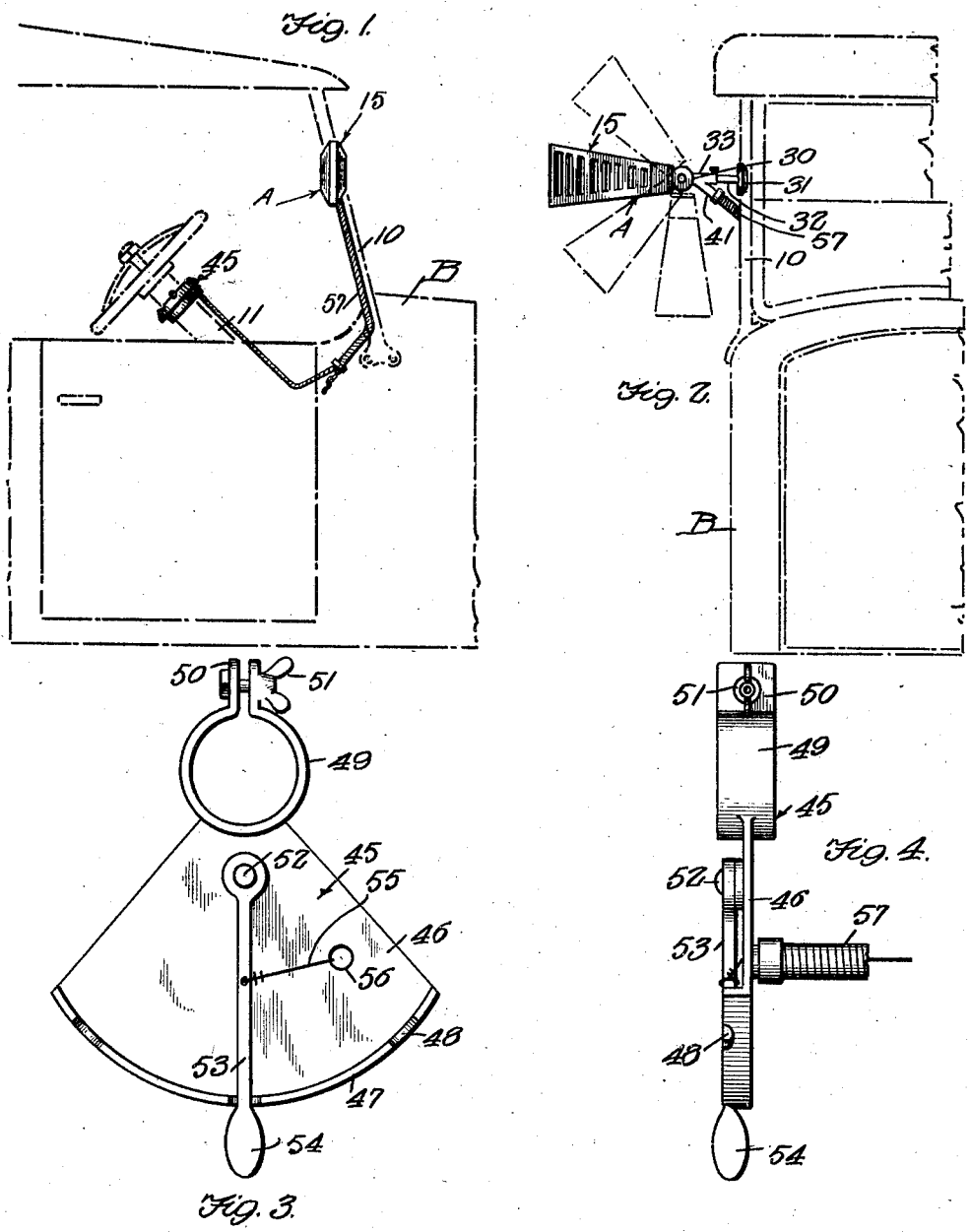
LeRoy L. Schmidt, Inventor
Witnesses
By Richard B. Owen.
Attorney March 8, 1927.

LE ROY L. SCHMIDT

TRAFFIC SIGNAL

Filed July 8, 1925

1,620,576

2 Sheets-Sheet 2

LeRoy L. Schmidt  Inventor

By Richard B. Owen

Witnesses

Attorney

Patented Mar. 8, 1927.

1,620,576

UNITED STATES PATENT OFFICE.

LE ROY L. SCHMIDT, OF SOUTH TACOMA, WASHINGTON.

TRAFFIC SIGNAL.

Application filed July 8, 1925. Serial No. 42,266.

This invention appertains to automobile appliances and the primary object of the invention is to provide a novel signal for automobiles, which can be readily operated by the driver of the vehicle from the interior thereof for indicating to traffic the intended change of course of the vehicle.

Another object of the invention is to provide a traffic signal for automobiles embodying a swinging arm connected with the side of the vehicle and novel means for actuating the arm from the interior of the vehicle.

A further object of the invention is to provide novel means for supporting the arm to facilitate the rotation thereof.

A further object of the invention is the provision of a novel arm for the signal, which embodies an elongated casing having an illuminating means at the inner end thereof and converging side walls, the side walls being provided with novel reflectors for directing the rays of light forwardly and rearwardly of the arm to permit the arm to be readily seen at night time, the arm being painted or enameled in a distinctive manner to facilitate the seeing thereof at all times.

A still further object of the invention is to provide a direction signal for a motor vehicle of the above character, which will be durable and efficient in use, one that will be simple and easy to manufacture and one which can be placed upon the market and incorporated with a motor vehicle at a small cost.

With these and other objects in view, the invention consists in the novel construction, arrangement and formation of parts, as will be hereinafter more specifically described, claimed, and illustrated in the accompanying drawings, in which drawings:

Figure 1 is a fragmentary side elevation of the automobile with the improved direction signal incorporated therewith, Figure 2 is a front elevation of the motor vehicle showing the improved signal incorporated therewith, and illustrating the different signaling positions of the arm.

Figure 5:
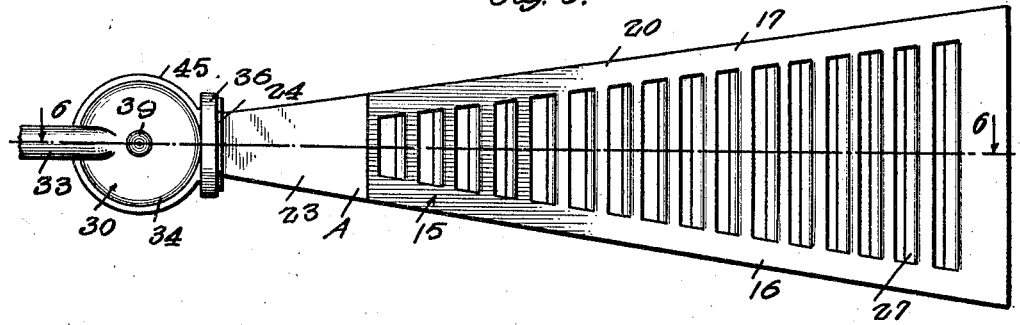
Figure 6:
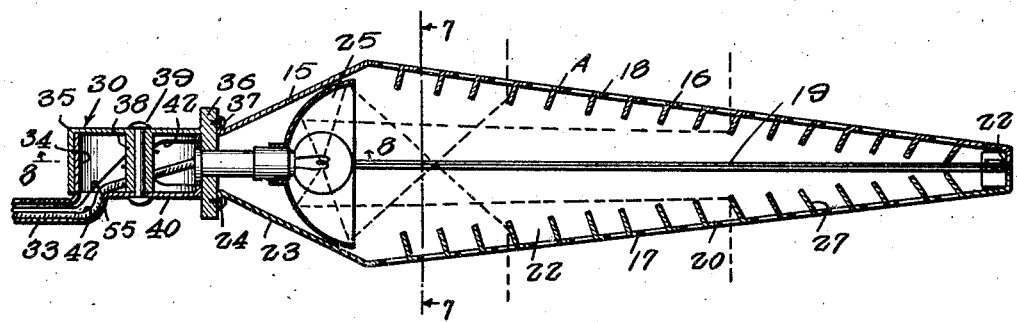
Figure 7:
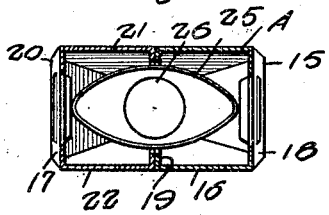
Figure 8:
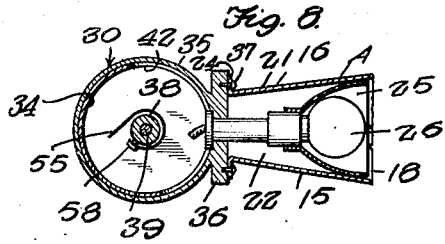

Figure 3 is a plan view of the operating member for the signaling arm, which is adapted to be connected with the steering post of the vehicle, Figure 4 is an edge elevation of the same, Figure 5 is an enlarged side elevation of the improved signaling arm, Figure 6 is a horizontal longitudinal section taken through the same on the line 6—6 of Figure 5, Figure 7 is a transverse section through the signaling arm taken on the line 7—7 of Figure 6 looking in the direction of the arrows, Figure 8 is a fragmentary vertical longitudinal section taken through the signaling device and the support therefor on the line 8—8 of Figure 6, looking in the direction of the arrows.

Referring to the drawings in detail, wherein similar reference characters designate corresponding parts throughout the several views, the letter A generally indicates the improved direction signal and B an automobile with which the same can be incorporated. The automobile can be of any preferred type or make, and in the present instance has been shown as a touring car and the same includes the usual windshield standard 10 and the steering column 11.

The improved signal A comprises the novel signaling arm 15, the novel support 30 therefor and the operating means 45 for moving the signaling arm to its different signaling positions.

The novel signaling arm 15 embodies a hollow casing 16 preferably formed of sheet metal, suitably treated as to resist the elements and to present a pleasing and attractive appearance to the eye. The hollow casing is preferably constructed from a pair of companion sections 17 and 18 which are provided with abutting flanges 19 at the longitudinal center of the casing. These flanges can be connected in any desired way such as by tongues and slots. These sections 17 and 18 define side walls 20, top and bottom walls 21 and 22 and an end wall 23. The side walls 20 gradually converge toward each other at the outer ends of the casing and these walls also gradually decrease in width toward the outer end. The inner ends of the side walls 20 are provided with inwardly directed portions 23 as can be clearly seen by referring to Figures 5 and 6 of the drawings. The inner end of the casing is flared to provide an annular retaining flange 24, for a purpose, which will be hereinafter more fully described. Disposed within the inner end of the casing is arranged a deflector 25 and this deflector terminates with the meeting portions of the inwardly directed extensions 23 and the main converging portions of the side walls 20. This deflector 25 supports a suitable incandescent lamp 26 and socket therefor. The socket can be extended beyond the inner end of the arm for a purpose, which will also be hereinafter more fully described.

In accordance with this invention the converging portion of the side walls 20 are provided with a plurality of inwardly directed struck out flanges or louvers 27, which extend approximately the full width of the said side walls. These flanges or louvers 27 are so treated as to constitute deflectors and are adapted to direct the rays of light emanated from the incandescent lamp 26 outwardly from the opposite sides of the arm so as to permit the arm to be seen from a relatively long distance. The louvers are bent at different angles relative to one another and to the side walls, so that the rays will be all directed at right angles to the longitudinal axis of the arm.

The novel support 30 for the signaling arm embodies a bracket 31 which can be secured to one of the windshield standards 10 in any desired way. This bracket 31 includes an outwardly extending supporting arm 32 on which is adjustably mounted a sleeve 33. The sleeve 33 can be held in its adjusted position on the arm 32 in any preferred manner. The extreme outer end of the sleeve 33 has formed thereon the laterally extending annular bearing cuff 34 which rotatably receives a cup 35. This cup is provided at the outer end thereof with an attaching disk 36 against which is fitted the annular flange 24 and suitable machine screws 37 can be utilized for rigidly connecting the disk with the flange. The cup 35 is provided with an axial hub 38 through which extends a pivot bolt 39. The pivot bolt 39 extends axially through the supporting plate 40 for the annular bearing cuff 34. By this construction, it can be seen that the arm is rotatably supported on the vehicle in a novel manner which permits the ready turning thereof. The sleeve 33 is provided with an inwardly directing guide 41, through which the electric wires for the incandescent lamp are adapted to extend. Any suitable means can be provided for controlling the flow of current through the electric wires, which are indicated by the reference character 42 and if preferred means can be arranged, to permit the automatic lighting of the lamp at different times according to the positions of the signaling arm 15.

The means 45 for changing the position of the arm 15 embodies a quadrant shaped plate 46 having the arcuate edge thereof provided with an upstanding flange 47. This flange 47 is provided at spaced points with notches 48 which indicate the signaling positions of the arm. The inner converged end of the quadrant shaped plate 46 is provided with a split attaching sleeve 49 which is adapted to encircle the steering column 11 of the automobile B. The slit portion of the attachment collar 49 is provided with parallel ears 50 through which is adapted to extend a tightening bolt 51 firmly clamping the collar on the steering post. Pivoted as at 52 to the quadrant plate 46 is the resilient operating lever 53 the outer end of which is provided with a manipulating handle 54. This lever is adapted to ride over the flange 47 and to spring in the notches 48, which hold the lever normally against movement in an adjusted position. The lever 53 has secured thereto at a point intermediate its ends, a wire pull cable 55, which is preferably formed of piano wire. This cable 55 is threaded through a suitable opening 56 in the plate 46 and through a flexible tube 57 which leads to the guide 41 formed on the sleeve 33. The flexible cable 55 extends through the guide and sleeve 33 into the annular bearing cuff 34 and is secured to the hub 38, as at 58. It is to be noted at this point that the bearing cuff 34 is slotted as at 42 to permit movement of the socket for the incandescent lamp 26 in said cuff during the rotation of the arm.

In use of the improved device, the lever 53 which is arranged directly below the steering wheel of the automobile is swung in the desired direction, which movement will be transmitted to the arm 15 by means of the flexible cable 55 causing the raising or lowering of the arm, as the case may be. The different positions of the signaling arm indicate different changes in the course of the vehicle as can be readily understood by those skilled in the art.

The arm 15 shown in Figure 5 should be made of suitably colored enamel ware, when a white light is used therewith. When a green, red, blue or other colored lamp is used, the arm should be made of white enameled material. This is an important feature of the invention and permits the ready cleaning of the arm at all times.

Changes in details may be made without departing from the spirit or scope of the invention, but:

What I claim as new is:

1. The combination with an automobile including a body and a steering post, of a direction signal therefor comprising a bracket secured to the side of the body embodying a hollow arm, a hollow annular bearing cuff formed on the arm, a signaling arm, an incandescent lamp carried by the inner end of the signaling arm, means for deflecting the rays of light emanated from the incandescent lamp outward from the opposite sides of the signaling arm, a bearing cup formed on the inner end of the arm rotatably mounted upon the bearing cuff, a hub formed on the bearing cup, an operating lever associated with the steering post, and a flexible cable secured to the lever extending through the hollow arm into the hollow bearing cuff and connected to said hub.

2. A direction signal for motor vehicles comprising a supporting bracket including a hollow sleeve, a depending inwardly directed hollow guide formed on the sleeve, a laterally extending hollow bearing cuff formed on the outer end of the sleeve, an elongated signaling arm, an incandescent lamp carried by the inner end of the signaling arm, means for reflecting the rays of light emanated from the incandescent lamp outward from the opposite sides of the signaling arm, a bearing cup carried by the inner end of the arm rotatably mounted upon said cuff, an axially disposed hub formed on the cup, and a pivot shaft extending through the hub connected with the cuff in a flexible cable extending through the guide and sleeve and connected to said hub.

3. In a direction signal for automobiles, an elongated signaling arm embodying a hollow casing including side walls, a source of light disposed at the inner end of the hollow casing, and transversely extending reflecting louvers carried by the side walls for reflecting the rays of light outward from the opposite sides of said signaling arm.

4. In a direction signal for automobiles, an elongated signaling arm embodying a hollow casing having side walls, a source of light disposed at the inner end of the casing, a reflector from the source of light for directing the rays of light toward the front end of the casing, and inwardly deflecting struck louvers formed on the side walls and extending transversely thereof for directing the rays of light outward from the opposite sides of the signaling arm.

5. In a direction signal, an elongated signaling arm embodying a hollow casing having diverging side walls, a source of light disposed in the hollow casing at the diverging portion of the side walls, inwardly directed louvers struck out from the side walls and extending transversely thereto for directing the rays of light outward from the opposite sides of the hollow casing, said louvers being arranged at different angles relative to one another and to the side walls, as and for the purpose specified.

6. In a direction signal for automobiles, an elongated signaling arm embodying a hollow casing having side walls gradually converging toward their outer ends, a source of light arranged in the casing at the inner end thereof, a reflector for said casing, a plurality of transversely extending louvers struck out from the side walls and directed inwardly to form reflectors for directing the rays of light outwardly from the opposite sides of the casing, the louvers being arranged at different angles relative to one another and to the side walls of the casing, an annular attaching flange formed on the inner end of the hollow casing, a plate connected to said flange, and a hollow bearing cup carried by said plate.

In testimony whereof I affix my signature.

LE ROY L. SCHMIDT.